United States Patent [19]

Pizzi

[11] Patent Number: 5,260,637
[45] Date of Patent: Nov. 9, 1993

[54] ELECTRICAL SYSTEM FOR A MOTOR VEHICLE, INCLUDING AT LEAST ONE SUPERCAPACITOR

[75] Inventor: Pietro Pizzi, Turin, Italy
[73] Assignee: Magneti Marelli S.p.A., Milan, Italy
[21] Appl. No.: 927,159
[22] Filed: Aug. 7, 1992
[30] Foreign Application Priority Data
  Sep. 18, 1991 [IT] Italy ................. 91A 000708
[51] Int. Cl.⁵ ................................. H02J 1/00
[52] U.S. Cl. ........................... 320/6; 320/1; 320/15
[58] Field of Search .......... 320/1, 5, 6, 15, 35, 320/36, 61, 64; 322/7, 8; 219/203
[56] References Cited

U.S. PATENT DOCUMENTS

| | | | |
|---|---|---|---|
| 4,127,782 | 11/1978 | Omura et al. | 320/6 X |
| 4,612,492 | 9/1986 | Burk | 320/6 X |
| 4,673,797 | 6/1987 | Weirick | 320/64 X |
| 4,709,200 | 11/1987 | Ochiai | 320/1 |
| 5,041,776 | 8/1991 | Shirata et al. | 320/1 |
| 5,117,173 | 5/1992 | Oliva et al. | 320/13 X |
| 5,119,010 | 6/1992 | Shirata et al. | 320/15 |
| 5,161,094 | 11/1992 | Bruder et al. | 320/15 X |
| 5,162,720 | 11/1992 | Lambert | 320/6 |

FOREIGN PATENT DOCUMENTS

| | | | |
|---|---|---|---|
| 62-207145 | 9/1987 | Japan . | |
| 0055535 | 2/1990 | Japan | 320/1 |
| 2087173 | 5/1982 | United Kingdom . | |
| 90/02440 | 3/1990 | World Int. Prop. O. . | |

*Primary Examiner*—Kristine L. Peckman
*Attorney, Agent, or Firm*—Fish & Richardson

[57] ABSTRACT

The system includes at least one auxiliary electrical user device which, in order to be activated, needs a high power for a short period of time,
a rechargeable battery,
an electrical generator for recharging the battery and
at least one supercapacitor for storing enough energy to activate the user device The connection of the supercapacitor to the user device is controlled by an electronic unit in dependence on the charge state of the supercapacitor and the temperature of the user device.

5 Claims, 1 Drawing Sheet

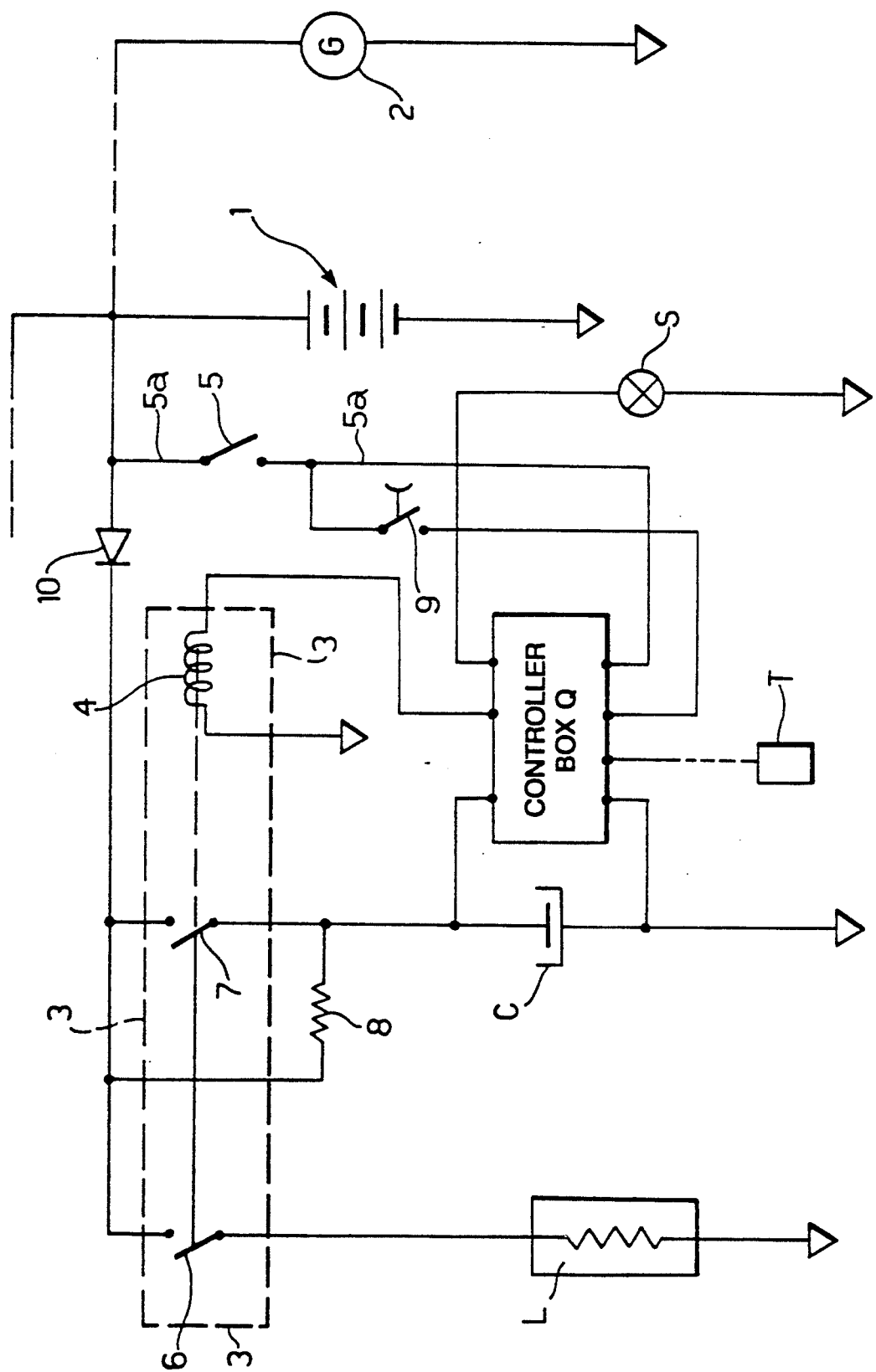

ELECTRICAL SYSTEM FOR A MOTOR VEHICLE, INCLUDING AT LEAST ONE SUPERCAPACITOR

The present invention relates to an electrical system for a motor vehicle, particularly a vehicle with an internal combustion engine.

More specifically, the invention relates to a system including at least one auxiliary electrical user device which, in order to be activated; needs a high electrical power for a relatively short period of time.

The electrical system according to the invention is characterised in that it also includes in combination:
a rechargeable storage battery,
an electrical generator for recharging the battery,
at least one supercapacitor for storing enough electrical energy to activate the user device,
control circuitry which is adapted, in a first condition, to connect the at least one supercapacitor to the storage battery to enable the supercapacitor to be charged/recharged and, in a second condition, to connect the supercapacitor to the user device in order to activate it,
electrical temperature sensor means associated with the at least one user device,
at least one indicator, and
an electronic control unit which is connected to the supercapacitor, to the temperature sensor means, to the indicator and to the control circuitry, and which is arranged to activate the indicator and to enable the supercapacitor to be connected to the user device only when the charge in the supercapacitor is greater than a predetermined value and the temperature detected by the sensor means is below a predetermined value.

Electrical capacitors with much higher capacitances than conventional capacitors have recently become available. These new capacitors, known as supercapacitors and also as molecular or double-layer capacitors, enable extremely large quantities of electricity or charge to be stored and can be charged and discharged within very short periods of time, that is, they have much higher specific powers than are possible with conventional electrochemical accumulators.

The present invention consists of the advantageous use of such a supercapacitor in an electrical system for a motor vehicle in order to supply an electrical user device which, in order to be activated, needs to be supplied with a high electrical power for a relatively short period of time.

Further characteristics and advantages of the invention will become clear from the detailed description which follows with reference to the appended drawing, provided purely by way of non-limiting example.

With reference to the drawing, an electrical system for a motor vehicle includes a rechargeable storage battery 1 associated, in conventional manner, with an electrical generator 2, such as an alternator, which can be operated by the engine of the motor vehicle.

The generator 2 recharges the storage battery 1.

An auxiliary electrical user device which, in order to be activated, requires a high electrical power for a relatively short period of time, is indicated L. This electrical user device may be, for example, a heating resistor associated with the windshield or with the rear window of the motor vehicle. In this case, the user device L is for rapidly defrosting the associated window of the vehicle during cold weather.

In the case of a vehicle with a catalytic converter, the user device L may be constituted by a heating resistor associated with the catalytic converter for ensuring that it is effectively preheated before the engine is started in order to reduce harmful and polluting emissions.

A supercapacitor with a high capacitance is indicated C in the drawing. Supercapacitors with capacitances of about 1000 F are currently available and can supply currents of the order of hundreds of amperes (about 300 A) for periods of time of the order of tens of seconds (up to about 1 minute).

An electromagnetically-controlled double switch is indicated 3. In the embodiment shown by way of example, this includes an excitation solenoid 4 having one end connected to earth and its other end connected to an electronic control unit (a central control unit) Q and connectible to the battery 1 by means of a manually-operated switch 5 interposed in a lead 5a between the unit Q and the battery. Switch 5 be operable, for example, by the ignition and starter switch of the motor vehicle.

The solenoid 4 controls the positions of two normally-open switches 6, 7 which, in the closed condition, can connect the supercapacitor C to the user device L.

In the closed condition, the switch 7 short-circuits a resistor 8 which is connected between the storage battery 1 and the supercapacitor C.

When the switches 6 and 7 are open, the user device L is disconnected both from the supercapacitor C and from the storage battery 1. Battery 1 is connected to the supercapacitor C through the resistor 8. In this condition, the supercapacitor C can be charged/recharged as appropriate.

A diode 10 prevents the discharge of the supercapacitor C from affecting other user devices or loads which are to be supplied only by the storage battery 1 in operation.

The unit Q is also connected to the supercapacitor C and to an electrical temperature sensor T immediately adjacent the user device L. An indicator S, such as an indicator lamp, conveniently disposed in the passenger compartment of the motor vehicle is also connected to the unit Q.

The control unit Q is arranged, in operation, to monitor the charge level of the supercapacitor C and the temperature of the user device L and to activate the indicator S and enable the supercapacitor to be connected to the user only when the charge is greater than a predetermined value and the temperature indicated by the sensor T is below a predetermined value. The unit Q cuts off or prevents the connection between the capacitor and the user when the charge in the capacitor is below the threshold or the temperature of the user is above the predetermined value.

When the switch 5 is closed, the unit Q activates the indicator S if the charge state of the supercapacitor is adequate and the temperature detected by the sensor T is below the threshold. In this case, the indicator S indicates to the user that the entire device is in a suitable condition for operation and that it may be activated. In this condition, if the switch 9 which is interposed in a lead between the switch 5 and the unit Q is closed, the unit is activated to cause the excitation of the control solenoid 4 which in turn closes the switches 6 and 7. Consequently, the supercapacitor C is discharged rapidly into the auxiliary user device L, activating it until the charge of the supercapacitor falls below the predetermined level and/or the temperature detected by the sensor T is above a predetermined level.

As already stressed above, the supercapacitor C is conveniently arranged as near as possible to the user device L so as to reduce power losses in the connections.

Since one or more auxiliary electrical user devices in the vehicle can be supplied with energy by a supercapacitor, the capacity and hence also the weight and bulk of the storage battery used can be reduced. The battery is thus intended for storing energy for the electrical user devices which require low power and slow discharge and for keeping the supercapacitor charged.

Naturally, a bank of supercapacitors may be used instead of one supercapacitor.

Naturally, the principle of the invention remaining the same, the forms of embodiment and details of construction may be varied widely with respect to those described and illustrated purely by way of non-limiting example, without thereby departing from the scope of the present invention.

I claim:

1. An electrical system for a motor vehicle including at least one auxiliary user device which, in order to be activated, needs a high electrical power for a relatively short period of time, the system including in combination:

a rechargeable storage battery, an electrical generator for recharging the battery, at least one supercapacitor disposed immediately adjacent the user device for storing enough electrical energy to activate the user device, switch means for switching between at least a first and second condition, the first condition connecting the supercapacitor to the electrical generator to enable the supercapacitor to be charged/recharged, and the second condition connecting the supercapacitor to the user device in order to activate the user device, electrical temperature sensor means associated with the user device, and an electronic control unit which is connected to the supercapacitor and to the temperature sensor means, and which controls the switch means, the electronic control circuit placing the switch means in the second condition connecting the supercapacitor to the user device only when the charge in the supercapacitor is greater than a predetermined value and the temperature detected by the temperature sensor means is below a predetermined temperature.

2. An electrical system according to claim 1, for a motor vehicle with a catalytic converter, wherein the suer device is a heating resistor associated with the catalytic converter.

3. An electrical system according to claim 1, including, as the user device, a heating resistor associated with a windshield of the motor vehicle.

4. An electrical system according to claim 1, including, as the user device, a heating resistor associated with the rear window of the motor vehicle.

5. An electrical system according to claim 1, further comprising at least one indicator for indicating to a user of the motor vehicle that the charge of the supercapacitor is above the predetermined value and the temperature detected by the temperature sensor means is below the predetermined temperature.

* * * * *

UNITED STATES PATENT AND TRADEMARK OFFICE
CERTIFICATE OF CORRECTION

PATENT NO. : 5,260,637
DATED : November 9, 1993
INVENTOR(S) : Steven G. Leiserson et al It is certified that error appears in the above-indentified patent and that said Letters Patent is hereby corrected as shown below:

In column 1, line 9, replace "3,225,760" with --5,225,760--.

Signed and Sealed this

Tenth Day of May, 1994

Attest:

BRUCE LEHMAN

Attesting Officer     Commissioner of Patents and Trademarks